United States Patent
Ta et al.

(10) Patent No.: US 10,612,641 B2
(45) Date of Patent: *Apr. 7, 2020

(54) RING GEAR AND GEAR DEVICE

(71) Applicant: JOHNSON ELECTRIC INTERNATIONAL AG, Murten (CH)

(72) Inventors: Jing Ning Ta, Hong Kong (CN); Lap Wah Lo, Hong Kong (CN); Xing Ju Yi, Shenzhen (CN); Qiu Mei Li, Shenzhen (CN)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 204 days.

This patent is subject to a terminal disclaimer.

(21) Appl. No.: 15/660,347

(22) Filed: Jul. 26, 2017

(65) Prior Publication Data

US 2018/0051791 A1    Feb. 22, 2018

(30) Foreign Application Priority Data

Aug. 22, 2016 (CN) .......................... 2016 1 0704012
Jun. 14, 2017 (CN) .......................... 2017 1 0449137

(51) Int. Cl.
| | |
|---|---|
| *F16H 55/17* | (2006.01) |
| *F16H 1/28* | (2006.01) |
| *F16H 57/08* | (2006.01) |
| *F16H 1/46* | (2006.01) |

(52) U.S. Cl.
CPC .............. *F16H 55/17* (2013.01); *F16H 1/28* (2013.01); *F16H 57/08* (2013.01); *F16H 1/46* (2013.01); *F16H 2055/176* (2013.01)

(58) Field of Classification Search
CPC ................................................. F16H 2055/176
See application file for complete search history.

(56) References Cited

U.S. PATENT DOCUMENTS

| | | | | |
|---|---|---|---|---|
| 8,794,097 | B2* | 8/2014 | Buechner | F16D 13/683 74/446 |
| 9,776,483 | B2* | 10/2017 | Shchokin | B60J 5/107 |
| 2011/0287887 | A1* | 11/2011 | Zhou | B27B 5/32 475/331 |
| 2013/0269305 | A1 | 10/2013 | Wang et al. | |
| 2013/0274049 | A1 | 10/2013 | Zhu et al. | |
| 2014/0135165 | A1 | 5/2014 | Kruselburger | |
| 2016/0076622 | A1* | 3/2016 | Hu | F16H 1/46 475/331 |

* cited by examiner

*Primary Examiner* — Tisha D Lewis
(74) *Attorney, Agent, or Firm* — Muncy, Geissler, Olds & Lowe, P.C.

(57) ABSTRACT

The present invention relates to a ring gear and a gear reduction device. The ring gear includes an annular body with a plurality of mounting portions, and a plurality of teeth arranged on an inner circumferential surface of the annular body. The annular body and the teeth are integrally formed from powder metal, and the mounting portions and the teeth are at least partly overlapped in an axial direction of the annular body. The mounting portions are integrally formed with the annular body and the teeth, which results in concentricity between the mounting portion and the teeth being improved and cost of the ring gear being reduced. Furthermore, the mounting portions are overlapped with the teeth, which reduces the axial size of the ring gear.

15 Claims, 5 Drawing Sheets

RING GEAR AND GEAR DEVICE

CROSS REFERENCE TO RELATED APPLICATIONS

This non-provisional patent application claims priority under 35 U.S.C. § 119(a) from Patent Application No. 201710449137.9 filed in The People's Republic of China on 14 Jun. 2017 and Patent Application No. 201610704012.1 filed in The People's Republic of China on 22 Aug. 2016.

FIELD OF THE INVENTION

This invention relates to the field of gears, and in particular to a ring gear and a gear device such a planetary gear reduction device.

BACKGROUND OF THE INVENTION

In fabricating an internal ring gear of a planetary gear train of a conventional gear reduction device, the internal ring gear is usually firstly fabricated, and mounting portions for connecting with a flange are then formed using a machining process. The internal ring gear fabricated in this manner requires secondary machining and thus has a high cost. In addition, eccentricity may easily occur during the fabrication or assembly process, which thus affects the concentricity between the internal ring gear and the flange once they are connected.

SUMMARY OF THE INVENTION

Thus there is a desire to improve the concentricity of the ring gear and the flange when they are connected.

A first aspect of the present invention provides a ring gear, which includes a an annular body with a plurality of mounting portions; and a plurality of teeth arranged on an inner circumferential surface of the annular body. The annular body and the teeth are integrally formed from powder metal.

Preferably, the mounting portions and the teeth are at least partly overlapped in an axial direction of the annular body.

Preferably, the ring gear comprises a first ring gear part and a second ring gear part arranged along the axial direction of the annular body.

Preferably, the first ring gear part comprises a first annular body and first teeth, the second ring gear part comprises a second annular body and second teeth, the first teeth connecting with the second teeth.

Preferably, the first teeth are helical teeth, and the second teeth are straight teeth.

Preferably, axial outer ends of the mounting portions are flush with axial ends of the teeth.

Preferably, each of the mounting portions defines a connecting hole which passes through the annular body along a radial direction of the annular body.

Preferably, each of the mounting portions has a trapezoid recessed shape with its axial outer end wider than its axial inner end.

In another aspect, the present invention provide a gear device comprising a ring gear, a flange and a planetary gear train received within the ring gear. The ring gear comprises an annular body with a plurality of mounting portions; and a plurality of teeth arranged on an inner circumferential surface of the annular body. The annular body and the teeth of the ring gear are integrally formed from powder metal, and the mounting portions and the teeth are at least partly overlapped in an axial direction of the annular body. The flange is mounted to an end of the annular body of the ring gear. The flange comprises a plurality of engaging portions engaged with the mounting portions respectively.

Preferably, the flange comprises a flange body abutting the end of the ring gear, and a connecting portion extending from the flange body and being inserted into inside of the ring gear.

Preferably, the engaging portions protrude from an outer circumferential surface of the connecting portion, the mounting portions are recessed compared to the teeth, and the protruding engaging portions are respectively received in the recessed mounting portions.

Preferably, each of the engaging portions and mounting portions defines a connecting hole, the engaging portion of the flange defines a recessed area adjacent the connecting hole, the recessed area being configured to receive burrs around the connecting hole of the ring gear.

Preferably, the recessed area is a groove.

Preferably, each of the mounting portions has a trapezoid shape with its axial outer end wider than its axial inner end for facilitating entering of the engaging portions into the corresponding mounting portions.

Preferably, each of the mounting portions comprises a mounting surface contacting with a corresponding engaging portion, the mounting surfaces of the mounting portions being integrally formed with the annular body and the teeth.

Preferably, the connecting portion has a round circumferential surface configured to contact with tips of the teeth of the ring gear.

DETAILED DESCRIPTION OF THE PREFERRED EMBODIMENTS

Below, embodiments of the present invention will be described further with reference to the accompanying drawings.

Figure 1:
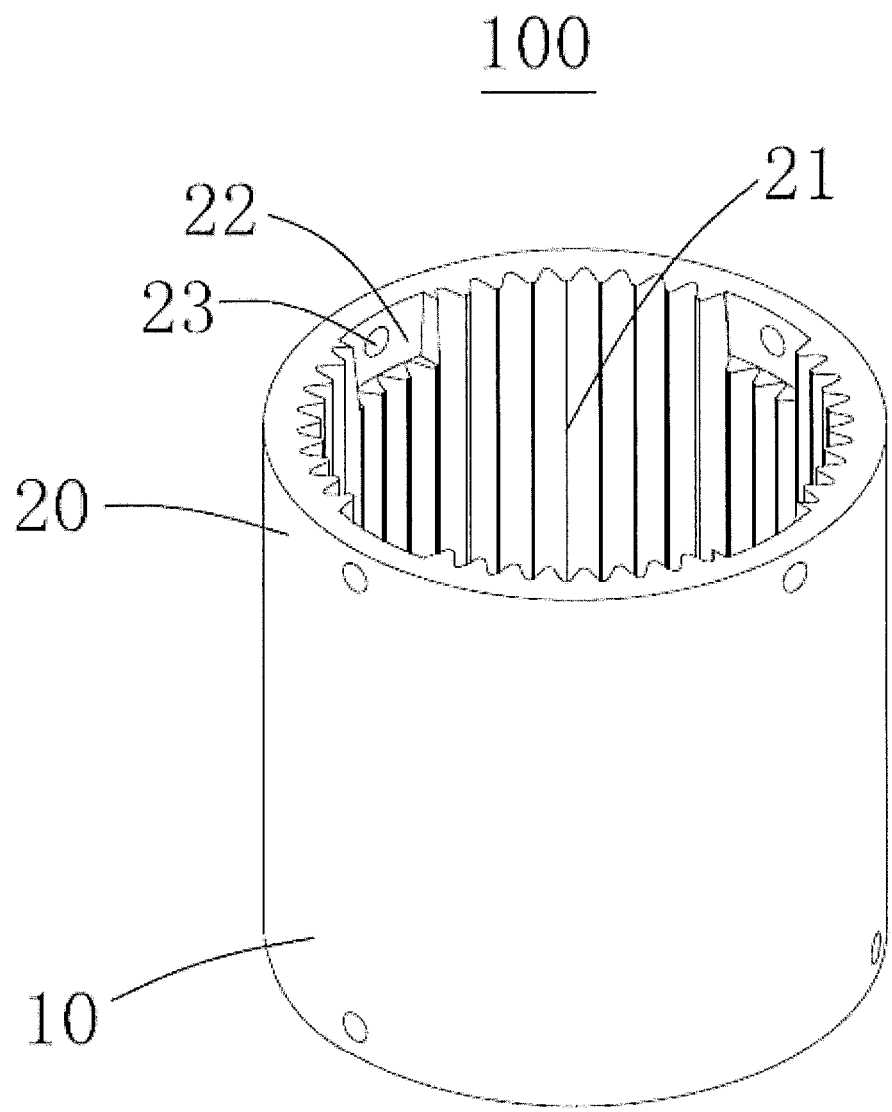
FIG. 1 illustrates a ring gear according to one embodiment of the present invention.
Figure 2:
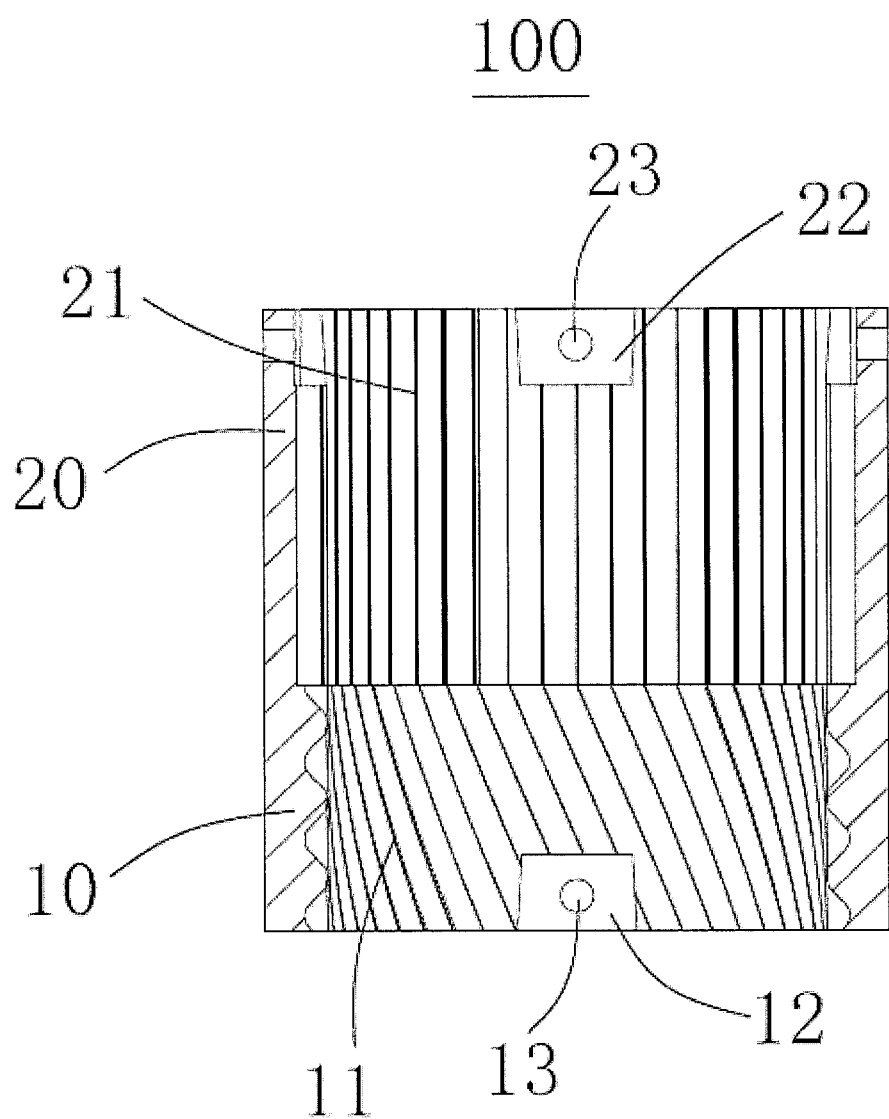
FIG. 2 is a sectional view of the ring gear of FIG. 1.

Referring to FIG. 1 and FIG. 2, the present invention provides a ring gear 100 made from a powder metallurgy material. Narrow and long pores are formed between powder metallurgy particles of the ring gear 100, and a maximum size of long sides of the narrow and long pores is less than 0.2 mm. In this embodiment, the ring gear 100 is a compound ring gear including a first ring gear part 10 and a second ring gear part 20. The first ring gear part 10 comprises a first annular body and a plurality of first teeth 11 formed on the inner surface of the first annular body. The second ring gear part 20 comprises a second annular body and a plurality of second teeth 21 formed on the inner surface of the second annular body. The first ring gear part 10 and the second ring gear part 20 are integrally formed. That is, the first and second annular bodies, the first teeth 11 and the second teeth 21 are integrally formed into a single piece with a monolithic structure. The first annular body of the first ring gear part 10 and the second annular body of the second ring gear part 20 are cooperatively formed as the annular body of the ring gear 100. In this embodiment, the teeth 11, 21 of the two stages of ring gear are formed on an inner circumferential surface of the annular body. In this embodiment, assembly of the first ring gear part 10 and the second ring gear part 20 may be omitted, which on one hand can avoid the secondary machining to the first ring gear part 10 and the second ring gear part 20, reduce an axial length of the ring gear 100 and reduce the cost, and on the other hand can avoid eccentricity due to errors during manufacturing or assembly the parts, thus improving the concentricity of the first ring gear part 10 and the second ring gear part 20.

Preferably, the ring gear 100 has a density less than 92% of its theoretical density, and a mass of 6.0 to 8.0 grams, and more preferably, 6.2 to 7.2 grams, per cubic millimeter.

The inner circumferential surface of the first ring gear part 10 is integrally formed with the first teeth 11. The inner circumferential surface of the second ring gear part 20 is integrally formed with the second teeth 21. Preferably, an axial inner end of the first teeth 11 is connected to an inner end of the second teeth 21, an axial outer end of the first teeth 11 is flush with an axial end of the annular body of the ring gear, and an axial outer end of the second teeth 21 is flush with an opposite axial end of the annular body of the ring gear. In an alternative embodiment, the inner end of the first teeth 11 and the inner end of the second teeth 21 may be disconnected, but instead spaced apart by an axial distance, i.e. a partition region without teeth is formed between the inner end of the first teeth 11 and the inner end of the second teeth 21, and the partition region has a smooth inner surface.

In this embodiment, the first teeth 11 and the second teeth 21 are equal in tooth number, unequal in tooth thickness, and unequal in tooth height. A cross section of each first tooth 11 and/or each second tooth 21 is involute in shape and may alternatively be triangular, rectangular or trapezoidal.

It should be understood that the first teeth 11 and the second teeth 21 may be equal in tooth thickness and tooth height. Alternatively, the first teeth 11 and the second teeth 21 may be unequal in tooth number. Slots between teeth of the first ring gear part 10 may be aligned and in communication with slots between teeth of the second ring gear part 21. Alternatively, the slots of the first ring gear part 10 and the second ring gear part 21 may not be aligned or in communication with each other.

In this embodiment, the first teeth 11 are helical teeth having a helical angle of 10° to 30°, preferably, 19°, 20° or 21°. The second teeth 21 are straight teeth, and an axial length of the first teeth 11 is less than an axial length of the second teeth 21.

It should be understood that the first teeth 11 and the second teeth 21 may be configured in another manner.

For example, the first teeth 11 are straight teeth, and the second teeth 21 are helical teeth; the first teeth 11 and the second teeth 21 are both helical teeth, the helical teeth of the first teeth 11 and the helical teeth of the second teeth 21 have the same helical angle but opposite helical directions; both the first teeth 11 and the second teeth 21 are helical teeth with the same helical direction but different helical angles. The first teeth 11 and the second teeth 21 may be configured depending upon actual requirements.

It should be understood that both the first ring gear part 10 and the second ring gear part 20 may also be external ring gears, i.e. the teeth 11, 21 of the two ring gears are formed on an outer circumferential surface of the annular body. Alternatively, one of the first ring gear part 10 and the second ring gear part 20 is an internal ring gear, and the other is an external ring gear.

Preferably, the first ring gear part 10 and the second ring gear part 20 are further integrally formed with mounting portions for connecting to flanges. In particular, the inner circumferential surface of the first ring gear part 10 is further integrally formed with a plurality of first recessed mounting portions 12. The mounting portion 12 has a mounting surface 14 which is radially recessed/sunk compared to the first teeth 11 around the mounting portion 12. Preferably, the first recessed mounting portions 12 extend to the end of the first ring gear part 10. The radial recessed/sunk depth of the recessed mounting portion 12 is equal to or greater than the radial height of the first teeth 11. In a radial plane view of the ring gear 100, the mounting surface 14 is located at a surface where the roots of the first teeth 11 are located or outside of the surface. A first connecting hole 13 such as first through hole 13 may be drilled in each first recessed mounting portion 12 after the mounting surface 14 of the first recessed mounting portion 12 is integrally formed with the first teeth 11, and the first through hole 13 may radially pass through a sidewall of the first ring gear part 10. Similarly, second recessed mounting portions 22 and second connecting hole 23 such as second through holes 23 are formed at the other end of the ring gear 100. The second recessed mounting portion 22 has a mounting surface 24 which is radially recessed/sunk compared to the second teeth 21 around the mounting portion 22. The radial recessed/sunk depth of the recessed mounting portion 22 is equal to or greater than the radial height of the second teeth 21. In a radial plane view of the ring gear 100, the mounting surface 24 is located outside of the roots of the second teeth 21 or flush with the roots of the second teeth 21. Preferably, the cross-section of each of the first recessed mounting portions 12 and the second recessed mounting portions 22 has a trapezoid shape with its axial outer end wider than its axial inner end, for facilitating assembly with the flanges. Preferably, the mounting surfaces 14 and 24 are curved. In this embodiment, the number of the first recessed mounting portions 12 and the number of the second recessed mounting portions 22 are both four, and the four first recessed mounting portions 12 and the four second recessed mounting portions 22 are respectively arranged uniformly along a circumferential direction of the ring gear 10.

The first ring gear part 10 and the second ring gear part 20 are respectively integrally formed with the first recessed portions 12 and the second recessed portions 22 for connecting with the flanges, such that secondary machining to the end portions of the ring gear 100 to form the mounting recessed portions is no longer required, which reduces the cost, avoids the eccentricity during the secondary machining process, ensures the concentricity of the ring gear 100 and the flanges when they are connected, and enhances the working efficiency. Furthermore, in the axial direction of the ring gear 100, the mounting portions 12, 22 are partly or fully overlapped with the first and second teeth 11, 21. Thus, the axial size of the ring gear 100 is much reduced.

Preferably, the ring gear 100 may be formed in a single mold cavity using powder metal and compressing process. Thus, there is no connection mark between the first annular body of the first ring gear part 10 and the second annular body of the second ring gear part 20. The annular body of the ring gear 10 has a smooth outer circumferential surface with no boundary line formed thereon.

Figure 3:
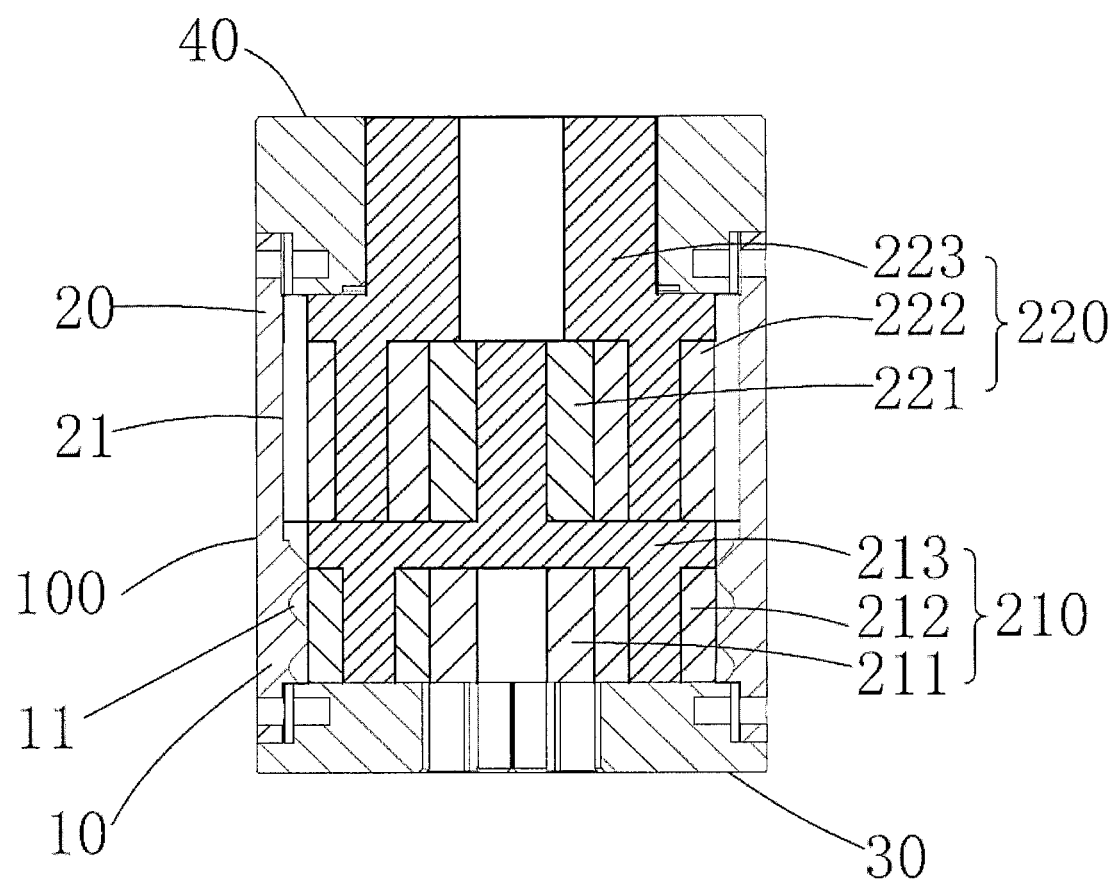
FIG. 3 is a sectional view of a gear reduction device employing the ring gear of the present invention.

FIG. 3 illustrates a gear device such a planetary gear reduction device 200 employing the ring gear 100 of the present invention. The gear device 200 includes a ring gear 100, a first flange 30, a second flange 40, a first planetary gear train 210, and a second planetary gear train 220. The first planetary gear train 210 and the second planetary gear train 220 are mounted within the ring gear 100. The first flange 30 is mounted to the end portion of the first ring gear part 10 of the ring gear 100, and the second flange 40 is mounted to the end portion of the second ring gear part 20 of the ring gear 100. The first ring gear part 10 has first teeth 11 on its inner circumferential surface, and the second ring gear part 20 has second teeth 21 on its inner circumferential surface.

The first planetary gear train 210 includes a first sun gear 211, a first planetary gear set 212, and a first rotary carrier 213. Each planetary gear of the first planetary gear set 212 meshes with both of the first sun gear 211 and the first ring gear part 10. As such, once the first sun gear 211 rotates, each planetary gear of the first planetary gear set 212 rotates both about its own axis and the first sun gear 211 so as to drive the first rotary carrier 213 to rotate.

The second planetary gear train 220 includes a second sun gear 221, a second planetary gear set 222, and a second rotary carrier 223. The second sun gear 221 is fixed on the first rotary carrier 213 and is rotatable along with the first rotary carrier 213. Each planetary gear of the second planetary gear set 222 meshes with both of the second sun gear 221 and the second ring gear part 20. The second rotary carrier 223 is disposed partially within the second flange 40. Once the second sun gear 221 rotates, each planetary gear of the second planetary gear set 222 rotates both about its own axis and the second sun gear 221 so as to drive the second rotary carrier 223 to rotate.

Figure 4:
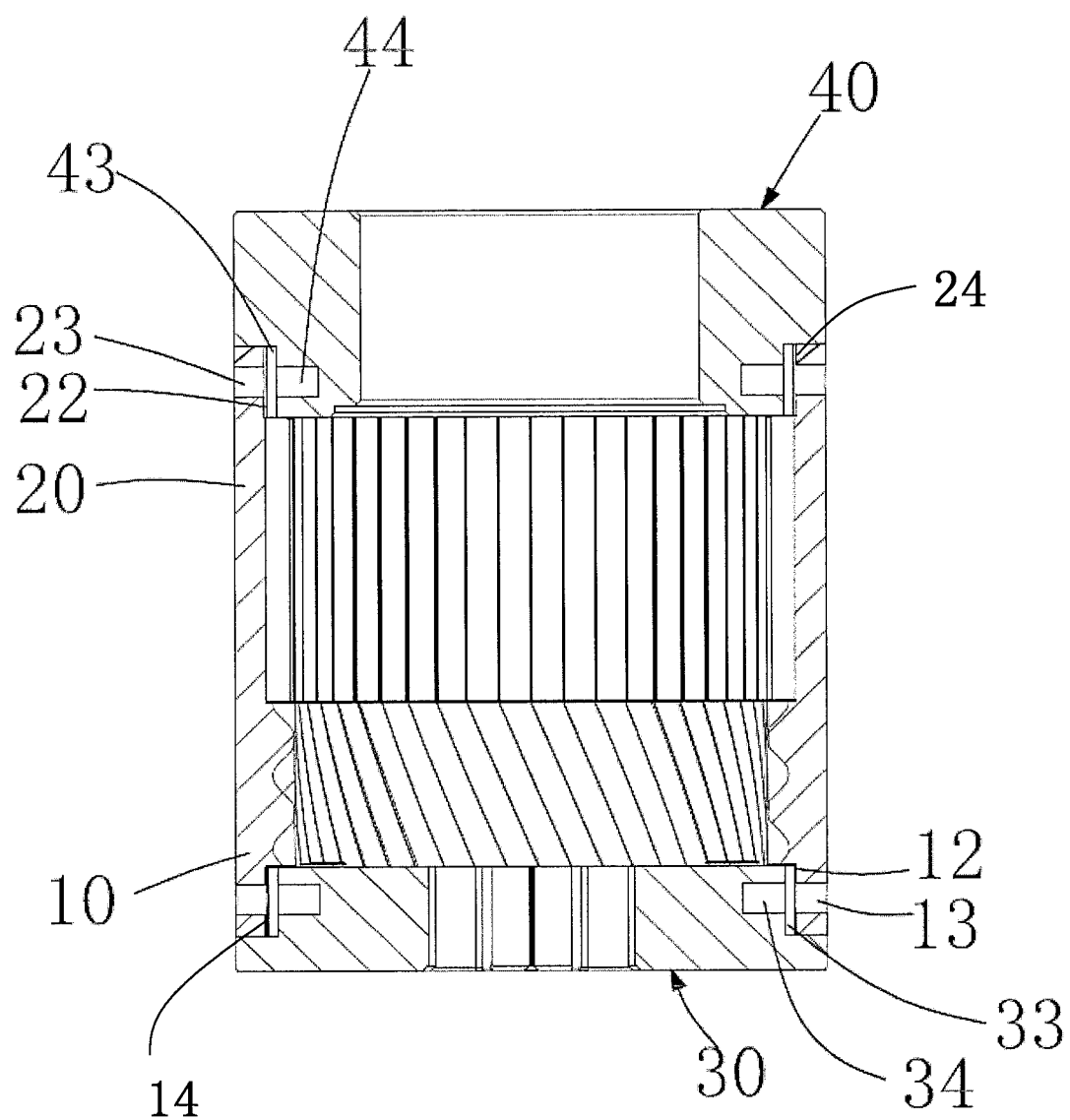
FIG. 4 is a sectional view of the gear reduction device of FIG. 3 with the planetary gear trains removed away.
Figure 5:
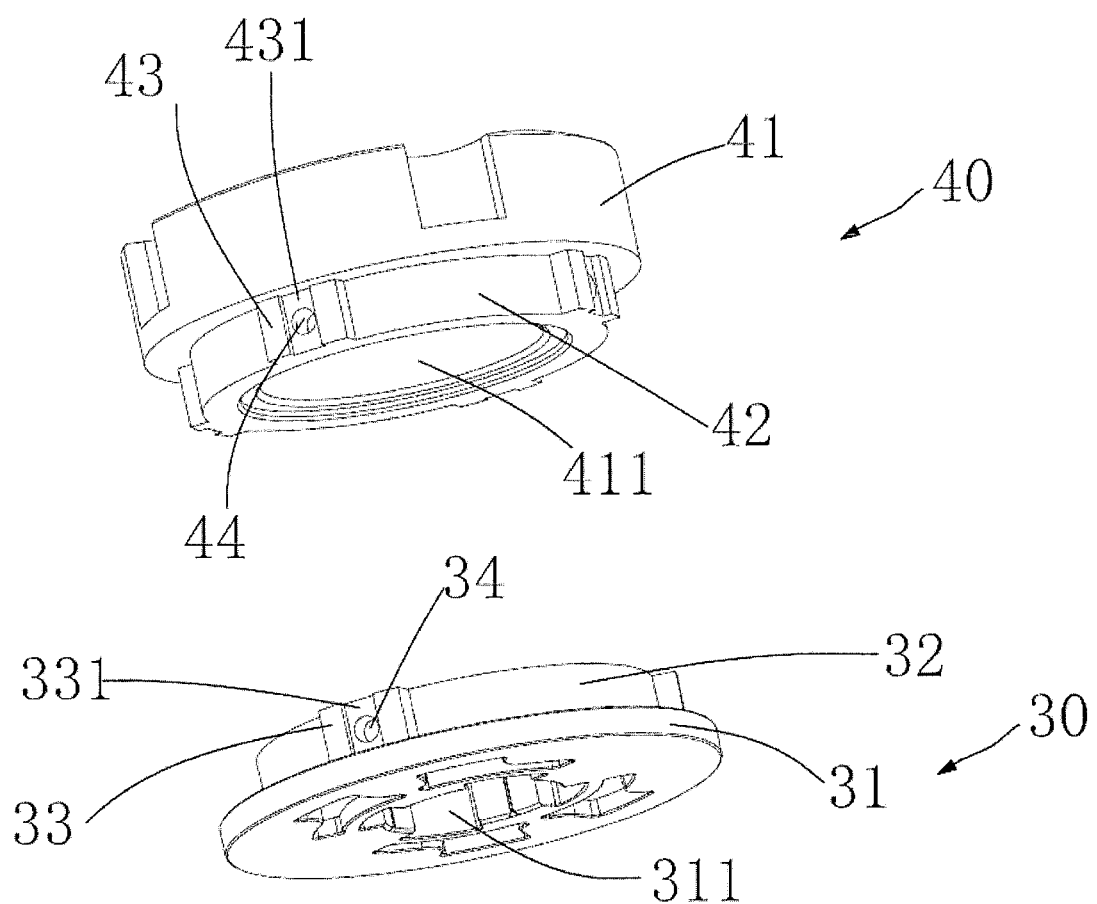
FIG. 5 illustrates two flanges of the gear reduction device of FIG. 3.

Referring to FIG. 4 and FIG. 5, the first flange 30 includes a first flange body 31 and a first connecting portion 32 formed at one end of the first flange body 31. The first connecting portion 32 can be inserted into the end portion of the first ring gear part 10. The first connecting portion 32 preferably has an annular circumferential surface which is configured to contact with the tips of the first teeth 11 of the first ring gear part 10 to ensure the flange 30 coaxial with the first ring gear part 10. The first flange 30 has an axial first center hole 311 for allowing a driving shaft or driven shaft, such as an output shaft of a motor, to pass therethrough. A plurality of first engaging portions 33 are formed on the outer circumferential surface of the connecting portion 32. Preferably, the first engaging portion are first protruding blocks 33 protruding from the outer circumferential surface of the connecting portion 32. Each first protruding block 33 matches with one corresponding first recessed mounting portion 12 of the first ring gear part 10. Preferably, each first protruding block 33 is engaged in a corresponding recessed mounting portion 12 of the first ring gear part 10. Each first protruding block 33 has a radially-extending connecting hole 34 which is aligned with the first connecting hole 13 of the corresponding first recessed mounting portion 12, for allowing a plug pin to pass therethrough so as to fix the first ring gear part 10 and the first flange 30 together. The connecting hole 34 is preferably blind hole 34.

The first through holes 13 may be drilled or punched, which may result in burr around the first through holes 13. In this regard, each first protruding block 33 provides a recessed area adjacent to the blind hole 34, so as to prevent interference between the burr and the first protruding block 33. In this embodiment, the recessed area is a vertical groove 331 located at opposite sides of the blind hole 34. In connecting the first flange 30 to the first ring gear part 10, the burr of the first through hole 13 of the first ring gear part 10 may be received in the vertical groove 331, and does not interference with a fastener such as a pin when the pin is plugged into the holes 13 and 34.

The second flange 40 is constructed in a fashion similar to the first flange 30, which includes a second flange body 41 and a second connecting portion 42 formed at one end of the second flange body 41. The second flange 40 has an axial second center hole 411 for allowing a driven shaft to pass therethrough. The second connecting portion 42 is preferably annular, with a plurality of second engaging portions such as second protruding blocks 43 formed on its outer circumferential surface. Each second protruding block 43 has a radially-extending blind hole 44 which is aligned with the second connecting hole 23 of one corresponding second recessed mounting portion 22. Each second protruding block 43 is formed with a recessed area, such as a vertical groove 431, at opposite sides of the blind hole 44. In connecting the second flange 40 to the second ring gear part 20, the burr of the second through hole 23 of the second ring gear part 20 may be received in the vertical groove 431, and to avoid interference with a fastener such as a pin when the pin is plugged into the holes 23 and 44. The second connecting portion 42 preferably has a round circumferential surface which is configured to contact with the tips of the second teeth 21 of the second ring gear part 20 to ensure the flange 40 coaxial with the second ring gear part 20.

With the use of the ring gear 100 of the present invention, the gear reduction device 200 has a reduced axial size, improved concentricity, more compact construction.

Alternatively, the ring gear 100 may be a simple/single ring gear, that is, the ring gear comprises only the first ring gear part 10 or only the second ring gear part 20.

Although the invention is described with reference to one or more embodiments, the above description of the embodiments is used only to enable people skilled in the art to practice or use the invention. It should be appreciated by those skilled in the art that various modifications are possible without departing from the spirit or scope of the present invention. The embodiments illustrated herein should not be interpreted as limits to the present invention, and the scope of the invention is to be determined by reference to the claims that follow.

The invention claimed is:

1. A ring gear comprising:
   an annular body with a plurality of mounting portions; and
   a plurality of teeth arranged on an inner circumferential surface of the annular body;
   wherein the annular body and the teeth are integrally formed from powder metal; the mounting portions and the teeth are at least partly overlapped in an axial direction of the annular body.

2. The ring gear of claim 1, wherein the ring gear comprises a first ring gear part and a second ring gear part arranged along the axial direction of the annular body.

3. The ring gear of claim 2, wherein the first ring gear part comprises a first annular body and first teeth, the second ring gear part comprises a second annular body and second teeth, the first teeth connecting with the second teeth.

4. The ring gear of claim 2, wherein the first ring gear part comprises a first annular body and first teeth, the second ring gear part comprises a second annular body and second teeth, and the first teeth are helical teeth and the second teeth are straight teeth.

5. The ring gear of claim 1, wherein axial outer ends of the mounting portions are flush with axial ends of the teeth.

6. The ring gear of claim 1, wherein each of the mounting portions defines a connecting hole which passes through the annular body along a radial direction of the annular body.

7. The ring gear of claim 1, wherein each of the mounting portions is a trapezoid recessed mounting portion with its outer end wider than its inner end.

8. A gear device comprising:
 a ring gear comprising an annular body with a plurality of mounting portions; and a plurality of teeth arranged on an inner circumferential surface of the annular body;
 a flange mounted to an end of the ring gear, the flange comprising a plurality of engaging portions engaged with the mounting portions of the ring gear respectively; and
 a planetary gear train disposed within the ring gear;
 wherein the annular body and the teeth of the ring gear are integrally formed from powder metal, and the mounting portions and the teeth are at least partly overlapped in an axial direction of the annular body.

9. The gear device of claim 8, wherein the flange comprises a flange body abutting the end of the ring gear, and a connecting portion extending from the flange body and being inserted into inside of the ring gear.

10. The gear device of claim 9, wherein the engaging portions protrude from an outer circumferential surface of the connecting portion, the mounting portions are recessed compared to the teeth, and the protruding engaging portions are respectively received in the recessed mounting portions.

11. The gear device of claim 10, wherein each of the engaging portions and mounting portions defines a connecting hole, the engaging portion of the flange defines a recessed area adjacent the connecting hole, the recessed area being configured to receive burrs around the connecting hole of the ring gear.

12. The gear device of claim 11, wherein the recessed area is a groove.

13. The gear device of claim 10, wherein each of the mounting portions has a trapezoid shape with its axial outer end wider than its axial inner end for facilitating entering of the engaging portions into the corresponding mounting portions.

14. The gear device of claim 9, wherein the connecting portion has a round circumferential surface configured to contact with tips of the teeth of the ring gear.

15. The gear device of claim 8, wherein each of the mounting portions comprises a mounting surface corresponding to a corresponding engaging portion, the mounting surfaces of the mounting portions being integrally formed with the annular body and the teeth.

* * * * *